United States Patent
Van Eijck et al.

(10) Patent No.: US 6,746,704 B1
(45) Date of Patent: Jun. 8, 2004

(54) PROCESS FOR PRODUCING A FRIED FOODSTUFF

(76) Inventors: Paulus Cornelis Maria Van Eijck, 365 Riverview Drive, Florenceville, New Brunswick (CA), E7L 3N1; Erwin Theofiel De Waele, Mandenmakerstraat 12, NL-4813 KH Breda (NL)

( * ) Notice: Subject to any disclaimer, the term of this patent is extended or adjusted under 35 U.S.C. 154(b) by 284 days.

(21) Appl. No.: 09/699,367

(22) Filed: Oct. 31, 2000

Related U.S. Application Data

(63) Continuation-in-part of application No. 09/125,363, filed as application No. PCT/NL97/00067 on Feb. 17, 1997, now abandoned.

(30) Foreign Application Priority Data

Feb. 16, 1996 (EP) ............................................ 96200400

(51) Int. Cl.⁷ ................................................. A23L 1/217
(52) U.S. Cl. ....................... 426/438; 426/441; 426/447; 426/637
(58) Field of Search ................................ 426/438, 441, 426/637, 447, 519, 511, 510

(56) References Cited

U.S. PATENT DOCUMENTS

| | | | |
|---|---|---|---|
| 2,278,470 A | 4/1942 | Musher | .................. 426/447 X |
| 2,778,736 A | 1/1957 | Wagner | ....................... 426/438 |
| 3,397,993 A | 8/1968 | Strong | .......................... 426/441 |
| 4,456,624 A | 6/1984 | Glantz et al. | .................. 426/96 |
| 4,585,660 A | 4/1986 | Sugisawa et al. | ........... 426/438 |
| 5,753,291 A | 5/1998 | Pederson et al. | ........ 426/637 X |

FOREIGN PATENT DOCUMENTS

| | | |
|---|---|---|
| DE | 738 841 | 9/1943 |
| GB | 2 046 070 | 11/1980 |
| GB | 2 157 539 | 10/1985 |
| WO | WO 84/03612 | 9/1984 |

OTHER PUBLICATIONS

M. Nonaka et al., "Texturizing Process controls Crispness and Rigidity of French Fried Potatoes", Food Technology, Apr. 1972, pp. 61, 64–66 and 68.

*Primary Examiner*—Arthur L. Corbin
(74) *Attorney, Agent, or Firm*—Young & Thompson

(57) ABSTRACT

A process for producing fried starch-containing foodstuffs is described, comprising a thermal treatment resulting in gelatinization of starch, partial frying, cooling, optional freezing and optional finishing, wherein the foodstuff is subjected to a mechanical surface treatment between said thermal treatment and said partial frying. The mechanical treatment may consist of sanding, brushing, combined heat and pressure drop and other treatments. The foodstuff obtained has improved crispness, even after a holding time after finish frying.

10 Claims, No Drawings

PROCESS FOR PRODUCING A FRIED FOODSTUFF

CROSS-REFERENCE TO RELATED APPLICATIONS

This application is a continuation-in-part of copending application Ser. No. 09/125,363, filed Sep. 1, 1998, now abandoned, which was the 35 USC 371 national stage of international application PCT/NL97/00067 filed on Feb. 17, 1997.

FIELD OF THE INVENTION

The invention relates to a process for producing a fried starch-containing foodstuff, such as fried potato, fried vegetables or fried fruit, having improved crispness.

BACKGROUND OF THE INVENTION

U.S. Pat. No. 4,751,093 describes a process of preparing fried potato pieces with improved texture and improved texture stability, wherein the potato pieces are disrupted at discrete locations of the surface to expose the interior of the pieces so as to allow moisture to escape during finish frying. The disruption is effected by scoring with a knife, after drying and partial flying (par-frying) and before finish flying. However, this treatment drastically changes the appearance of the product.

U.S. Pat. No. 5,141,759 discloses a potato product with increased crispness, which is produced by coating washed, cut, blanched and dried potatoes with an aqueous starch slurry and then par-frying the potato strips and freezing them. The starch slurry consists of chemically modified ungelatinized potato starch, water and other components such as corn starch and rice flour. U.S. Pat. No. 4,456,624 is aimed at enhancing crispness by impinging a high velocity stream of food particles such as potato granules, flakes, starch, flour and similar potato components, against the strips. However, the processes according to U.S. Pat. No. 5,141,759 and U.S. Pat. No. 4,456,624 require additional processing steps and additional ingredients in order to prepare and fix—by means of coating or impacting—a separate food component.

According to GB-A-2046070, blanched strips are subjected to a two-stage drying process, in which they are first exposed to high velocity ambient air and then further dried in circulating heated air. After subsequent par-frying, freezing and finish-frying, the product should demonstrate a mealy core and remain crisp and rigid for extended periods. The total moisture loss over both drying steps is about 18–26% by weight U.S. Pat. Nos. 3,397,993 and 3,649,305 also disclose hot air drying procedures of blanched ('993) and non-blanched ('305) potato strips, resulting in similar levels of moisture removal (20–30% and 10–30%, respectively). Texturing of French fries by surface-freezing to control crispness and rigidity is disclosed in *Food Technology* (1972) 61–68. GB-A-2157539 relates to making potato boats involving abrading the inner potato surface with starch particles. DE-C-738841 is concerned with producing fluffy potato pastry involving blanching, drying and puffing without flying.

Although these prior art products may have an increased crispness immediately after the production process, the crispness after finish frying and after a holding time of 10–20 minutes is still unsatisfactory. Consequently, there is a need for a simpler and more effective method of producing fried foodstuffs having an improved crispness, even a considerable period of time after finish frying.

SUMMARY OF THE INVENTION

It has been found now that this need can be fulfilled by a process comprising a thermal treatment wherein starch is gelatinized, optional drying, partial frying, cooling optional freezing and optional finishing the foodstuff, which is characterized in that one or more surface planes of the foodstuff is subjected to a mechanical surface treatment comprising a pressure drop at elevated temperature between said thermal treatment and said partial frying.

The mechanical treatment according to the invention is aimed at physically modifying essentially the entire surface area of one or more surface planes an is an essential step in the process of the invention. It is not necessary that the entire surface area of the foodstuff planes is modified and not even the major part of it, in order to improve crispness and especially retention of crispness of the finished product to a considerable extent. Since the method of the invention envisages to modify only the surface of the foodstuff, the depth of the modification within the product will be confined to the peripheral layers of cells. Therefore the modification will result in strips which are similar in appearance to conventionally produced fried foodstuff, such as potato chips. An additional and unexpected advantage of the present process is that the product obtained requires a shorter finish-fiying time.

The term "finishing" as used herein denotes any final heat treatment for obtaining a ready-to-eat foodstuff. It will denote finish flying, i.e. cooking in oil or fat, but it can also mean other heat treatments such as oven baking (hot air, grill, microwave etc.). The effects of the treatment of the invention occur irrespective of the type and the timing of the finishing treatment.

The process according to the invention can be applied to any starch-containing foodstuff, such as root crops, tuberous plants such as potato and taro, and starch-containing fruits such as bananas. The process can also be used for fried particulate products largely consisting of starch, such as rice, tapioca, manioc an the like. The process is especially suitable for producing fried potato products.

The process according to the invention is described below in more detail with a reference to fried potato chips (American: French fries), but it should be understood that the process is equally applicable to other foodstuffs as defined here above, including potato crisps (referred to in some languages including German and Dutch as "chips").

DETAILED DESCRIPTION OF THE INVENTION

Potatoes destined for the production of chips are first steam-peeled by quickly cooking the skin at high pressure and removing it by brushing, rubbing or spraying. Then the potatoes are selected to remove blemishes, and are cut according to the desired final shape. The cut potatoes are then blanched, which involves heating at 65–100° C. for a short time so as to gelatinize the starch and to leach out soluble reducing sugars. Blanching may be done repeatedly, with intermittent cooling. After optional dipping (addition of chemicals such as calcium or sugars) the blanched potato pieces are usually partially dried at 60–140° C., in order to enhance crispness, to reduce fat uptake and/or to save energy.

The next step in potato chip production is partial deep-frying (par-frying) for 30 seconds to 6 minutes at 135–190° C. in cooling oil or fat in order to evaporate water at the surface. After par-frying, superficial fat may be removed and then the chips are cooled and, in case of frozen chips, deep-frozen. Before consumption, the chips are finish fried.

The mechanical surface treatment according to the invention results in damaging the surface structure especially of the surface cells of the gelatinized foodstuff. Such treatments include "external" treatments such as sanding, brushing, rubbing, and the like, but also treatments which induce "damaging from inside", e.g. expansion by forced evaporation, such as sudden pressure drop (steam, air or the like) at high temperatures irradiation. The mechanical surface treatments is preferably carried out above 0° C., i.e. without freezing, and does not just consist of a liquid treatment. Preferred temperatures for the mechanical treatment are between 40° and 1000° C., preferably between 55° and 90° C. The mechanical treatment may be performed using conventional equipment, such as carborundum sanding apparatus or steam peeling apparatus.

The pressure drop comprises a drop of at least 2.5 bar, preferably at least 5 bar, up to 200 bar. The initial pressure before the pressure drop is preferably at least 5 bar, up to about 200 bar. The lower pressure after the pressure drop is preferably 1 bar or lower, down to vacuum (lower than 0.01 bar). The depressurizing time is less between 2.5 seconds and 10 minutes, preferably between 10 seconds and one minute, typically 20–30 seconds; the depressurizing rate is advantageously at least 0.5 bar per second up to 5 bar per second. The pressure drop is preferably applied at a water content of the foodstuff of between 35% and 90%, most preferably between 50% and 85%, typically around 80%.

The mechanical treatments will result in a maximum enhancement of crispness and crispness retention in the finished product, when the starch in the peripheral layers of cells has been previously gelatinized. This can be done by blanching the raw tissue prior to the external mechanical treatment. It should be understood that the term "blanching" as used herein comprises any treatment involving exposure of the surface layer of the product to temperatures above 55° C., so as to allow gelatinization of the starch. If the mechanical treatment already comprises conditions resulting in surface gelatinization, such as with steam pressurizing-depressurizing, a previous blanching step is not required. The raw tissue can, immediately after washing, peeling and/or cutting, be subjected to a treatment under elevated (steam) pressure and a subsequent sudden pressure drop. Preferably such treatment is immediately followed by a drying and/or frying step, in order to fix the physically modified surface.

If a drying step is performed in the food production process, then the external mechanical treatment is preferably inserted between the blanching step and the drying step. The partial drying can be effected by air-drying for several minutes at temperatures of e.g. 60–140° C. The drying treatment may result in a fixing of the outer structure of the product as obtained by the surface treatment. It was found furthermore, that freezing the treated material is not necessary for obtaining an optimum crispness.

The product obtained by the process of the invention has an improved crispness, and remains crispy for an extended period of time, e.g. longer than 10 minutes after finish flying. At first, sight, the resulting product does not differ from conventionally produced chips, wherein the surface structure has not been disrupted after blanching. A closer examination, however, shows that the crust of the product has a fine-grained and crumbly-like appearance. A crispy and crackle-like mouthfeel is experienced upon eating. The product also allows a faster finish-frying.

EXAMPLE 1

This example illustrates the process of the invention to prepare crispier potato chips, which also remain crisp longer after finish frying.

3 kg of Santana potatoes (weight in water: 35 l [g/5000 g] dry matter content: 19.3%) are washed, peeled and cut into strips (10 mm×10 mm) by conventional methods. The potato strips are then blanched in tap water for 4 minutes at 80° C., followed by a second treatment in another blancher for 7 minutes at 65° C. The blanched potato strips are then brought into a high pressure steam vessel, using a "Women & Kuin" pilot line steam-peeling unit with a volume of 60 l. The strips are steamed at an overpressure of 15 bar for 10 seconds, after which the overpressure is immediately discharged. The steamed potato strips are removed from the vessel and air-dried at 70° C. for 4 minutes (weight loss about 10%) during which the disrupted surface layer—formed during the high pressure steaming treatment—is fixed on the potato strip surface. The potato strips are then par-fried in hardened palm fat at a temperature of 180° C. for 1 minute. Next, the strips are cooled for 10 minutes at 4° C., frozen for 8 minutes at −35° C. in a blast freezer at an air velocity of 3 m/s and subsequently stored at −18° C.

For final preparation, the frozen chips are finish fried in hardened palm fat at 180° C. for 2 minutes. Immediately after finish flying, the resulting french fries are judged in a blind test by 2 product experts. They are found to be significantly crispier than a control sample, which is prepared in the same way, however excluding the above described high pressure steam treatment of the blanched potato strips. Ten minutes after flying, the product experts judge the resulting french fries as still crispy, while the control sample has totally lost its crispy mouthfeel.

EXAMPLE 2

The processing of example 1 up to and including the blanching treatment is repeated. After blanching, the potato strips are rinsed for 10 seconds with cold tap water of about 10° C. The surface of each strip is then manually sanded with sandpaper of an intermediate coarseness (type: 60 P). During sanding, a slight pressure is exerted on the sandpaper while moving it about 5 times along the whole surface. Except for both ends, this sanding treatment is repeated for each side of the strips. Subsequently the strips are dried, par-fried, cooled, frozen, stored and finish fried as described in example 1.

The resulting product is judged by 2 product experts in a blind test as crispier than the non-sanded control sample, while the sanded strips also remain longer crisp after finish frying.

EXAMPLE 3

Tissue of the "Taro cocoyam" (*Xanthosoma sagitifolium*, of the family of Araceae) tuber is submitted to an identical processing and sanding treatment as described in example 2: Thus, after sanding the Taro strips are air dried, par-fried and cooled as in examples 1 and 2. After cooling, the Taro strips are immediately finish fried for 2 minutes at 180° C. Besides the resulting product, a non-sanded control sample is judged by 2 product experts in a blind test. Also for fried Taro tissue, a sanding treatment after blanching induces a higher crispy mouthfeel and a longer retention of crispness.

EXAMPLE 4

This example illustrates that for crisps—consumed at room temperature—the loss of crispness due to the exposure to water (vapor), is slower if the product is sanded prior to frying.

Tubers of the Santana variety, originating from the same lot as in examples 1 and 2, are washed, peeled and cut into slices of 2 mm thickness with a meat slicer. Adhering starch is washed of the slice surfaces, after which they are blanched for 5 minutes at 180° C. in tap water. The blanched samples are then sanded as described in example 2 and air dried during 2 minutes at 100° C. Subsequently, the slices are fried in groundnut oil at 180° C. until no more water vapor escapes from the slices. After cooling to room temperature, the sanded crisps, together with non-sanded control samples, are put onto a gauze which is horizontally placed 10 cm above a heated beaker filled with boiling water. In this way the crisps are exposed to water vapor for 7 minutes. The samples are then stored at room temperature at atmospheric humidity (±40% relative humidity) for 30 minutes, after which crispness is evaluated by 2 product experts in a blind test. The sanded slices are significantly crispier than the non-sanded ones.

EXAMPLE 5

This example illustrates that with the implementation in conventional chips processing of an external treatment such as sanding, not only frozen but also refrigerated potato chips with a crispier texture and a longer lasting rigidity can be produced.

Six kg of Bintje potatoes (weight in water: 402 [g/5000 g]; dry matter content: 21.8%) are processed up to and including the cooling treatment as described in example 2. After cooling to 4° C., half of the batch was stored at 40° C. in a refrigerator, while the other half was frozen in a tunnel blast freezer (in 8 min. from +4° C. to −18° C.) and stored in a freezing cell at −20° C. Parallel refrigerated and frozen non-sanded control samples were prepared and stored.

After a storage time of about 15 h, all batches were finished and judged. The refrigerated chips were finish-fried during 150 sec. at 180° C., while the frozen chips were finish fried during 180 sec. at 180° C. These temperature/time combinations resulted in comparable fat-free dry matter contents of all samples (38±1%).

For refrigerated as well as for frozen samples, two product experts in a blind test judged the sanded samples as significantly crispier and with better lasting rigidity 10 min after frying than the non-sanded control samples. Mutual comparison between the frozen and refrigerated samples revealed that the frozen chips were less crispy than the refrigerated chips. This was demonstrated for the sanded as well as for the control samples.

EXAMLE 6

This example illustrates that potato strips, when subjected to a high pressure steam treatment prior to drying and/or par-flying, need much shorter finish-frying times.

Three kg of Bintje potatoes (weight in water: 402 [g/5000 g]; dry matter content: 21.8%) are processed up to and including the cooling treatment as described in example 1. After cooling, the sample was stored at 4° C. in a refrigerator. Parallel non-stearned control samples were prepared and stored at 4° C.

After a storage time of 15 h. all samples were finish-fried at 180° C. and subsequently judged by 2 product experts. The steam-treated sample was finish-fried during 2 min. 30 sec. (=standard condition). The finish-frying of this sample resulted in a final fat-free dry matter (FFDM) content of 42%. In order to compare these steam treated French fries with a nonsteamed control sample with similar FFDM content, control samples were finish-fried for different frying times and FFDM content was determined for all of them. It appeared that the control sample needs a finish-frying time of 5 min. 30 sec., in order to reach the focussed FFDM content of about 42%!

Although immediately after finish-frying two product experts found no difference in crispness between the steamed sample and the control sample with similar FFDM content, the former demonstrated after a holding time of 10 min. a significantly more rigid texture. Also the steamed sample showed a significant lighter color after finish-frying than the control sample with similar FFDM content.

Thus, when steam-treated French fries are compared to a non-steamned control sample with similar FFDM content, the former:

needs a significant shorter (finish) frying time;
shows a longer lasting rigidity after finishing;
demonstrates a lighter frying color.

EXAMPLE 7

This example illustrates that a high pressure steam treatment executed on raw potato tissue enhances also crispness and crispness retention of the finished product compared to a nonsteamed control sample.

Three kg of Bintje potatoes (weight in water: 402 [g/5000 g]; dry matter content: 21.8%) were washed, peeled and cut into strips (10 mm×10 mm) by conventional methods. The raw potato strips were then brought into the high pressure steam vessel described in example 1. They were steamed at an overpressure of 15 bar for 10 seconds, after which the overpressure was immediately discharged. The steamed strips were then dried, par-fried and cooled as described in example 1. After cooling, the sample was stored at 4° C. in a refrigerator. Parallel a raw and non-steamed control sample was prepared and stored at 4° C.

After a storage time of about 15 h. all samples were finish-fried at 180° C. during 2 min. 30 sec. Two product experts judged in a blind test the steamed samples as significant crispier and with better lasting rigidity after 10 min. holding than the non-steamed control sample.

EXAMPLE 8

This example illustrates that French fries, subjected to a steam treatment during processing as according to the invention, have a significantly longer lasting rigidity than French fries which were subjected to a two stage drying treatment (GB-2046070).

Three kg of Agria potatoes (weight in water: 391 [g/5000 g]; dry matter content: 21.2%) were processed up to and including the steam treatment as described in example 1. The steamed potato strips were then removed from the vessel and air-dried at 7° C. for 10 min 30 sec., during which their weight was reduced by 22%. The dried strips were then par-fried in hardened palm fat at 180° C. for 1 min., cooled for 10 min. at 4° C. and stored at 4° C.

At the same time, samples were prepared which were not steamed after blanching, but subjected to a two stage drying procedure. In a first drying step, they were exposed to high velocity ambient air (face velocity of air=±3 m/s) at a temperature of 21° C. during 20 min., resulting in a weight reduction of the strips by 10.5%. Immediately thereafter, the strips were contacted with hot air of 70° C. for 7 min. 30 sec., reducing their weight by another 11.2%. Moisture distribution in the strips was then permitted to equalize by holding them for 6 min. in an enclosed unheated unit, after which they were par-fried at 180° C. for 1 min., cooled and stored at 4° C. Intermediate analysis revealed that after par-frying, the fat-free dry matter (FFDM) content of the two stage dried potato strips was similar to that of the par-fried steamed potato strips.

After a storage time of 15 h. all samples were finish-fried at 180° C. Finish-flying the steam treated sample during 2 min. 30 se. (=standard condition) resulted in a final EFDM content of 45% (on total mass). However, when the two stage dried potato strips were finish-fried during 2 min. 30 sec., their FFDM content only reached 45%.

In order to compare the resulting texture of both production methods on a basis of similar FFDM content, two stage dried par-fried samples were finish-fried for different frying times, after which their FFDM content was determined. The two stage dried sample needed a finish-frying time of 4 min., in order to reach the focused FDM content of 45%.

After finish flying, the products were judged and mutually compared by two independent. product experts:

1. on a basis of equal finish flying time (2 min. 30 sec.): steamed samples (according to the invention) were judged as significantly crispier, immediately after finish frying as well as after 10 min. of holding time.

2. on a basis of equal FFDM content (45% on total mass): although immediately after finish-frying two product experts found no difference in crispness between the steamed sample and the two stage dried sample, the latter lost most of its rigidity after a holding time of 10 min., whereas the steamed samples (invention) still demonstrated a texture almost as crispy and rigid as directly after finish frying.

What is claimed is:

1. In a process for producing a fried starch-containing foodstuff, which comprises:

blanching a starch-containing foodstuff at a temperature greater than 55° C. in order to obtain a gelatinized starch-containing foodstuff;

drying the gelatinized starch-containing foodstuff to obtain a dried foodstuff;

partially frying the dried foodstuff to obtain a partially fried foodstuff;

cooling the partially fried foodstuff to obtain a cooled partially dried foodstuff; and optionally finish-frying the cooled partially fried foodstuff;

the improvement which comprises:

subjecting the gelatinized starch-containing foodstuff to steam treatment at a pressure of at least 5 bars followed by a surface treatment comprising a pressure drop of at least 2.5 bars at elevated temperature, between the blanching and partially frying steps, said pressure drop being sufficient to physically modify the surface structure of the gelatinized starch-containing foodstuff and being applied at a water content of the starch-containing foodstuff of at least 35%.

2. The process according to claim 1, wherein the foodstuff is a potato product.

3. The process according to claim 1, wherein the blanching step is carried out at a temperature between 65 and 100° C.

4. The process according to claim 1, wherein the pressure drop comprises a drop of between 2.5 and 200 bars within 10–60 seconds.

5. The process according to claim 4, wherein the pressure drop is a drop of between 5 and 200 bars.

6. The process according to claim 4, wherein the pressure drop takes place within 20–30 seconds.

7. The process according to claim 4, wherein the pressure drop takes place at a rate of 0.5 to 5 bars per second.

8. The process according to claim 4, wherein the pressure drop is to a pressure no greater than 1 bar.

9. The process according to claim 1, wherein the pressure drop is performed at between 50 and 90% water content of the gelatinized foodstuff.

10. The process according to claim 1, wherein the blanching step is carried out at a temperature no a higher than 100° C. and the partial frying step is temperature of at least 135° C.

* * * * *